J. J. OLSON.
AUTOMOBILE JACK.
APPLICATION FILED APR. 21, 1917.
1,254,527.
Patented Jan. 22, 1918.
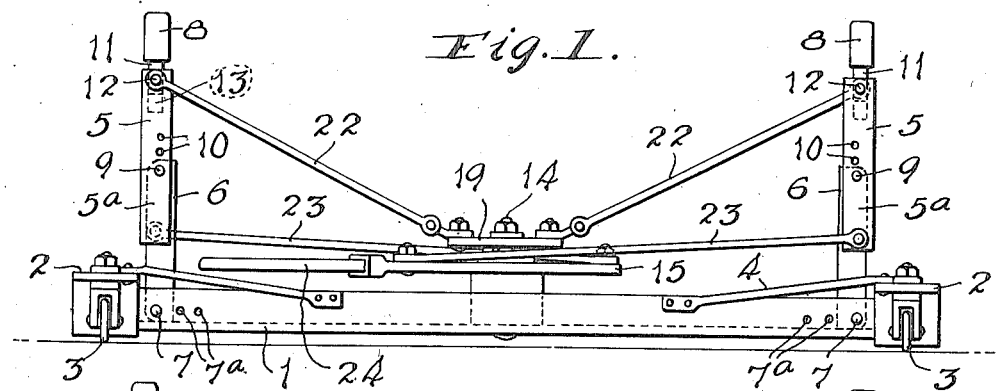
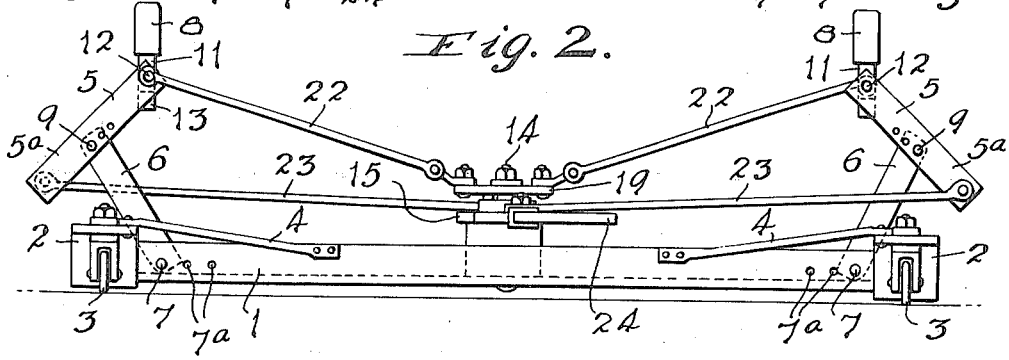
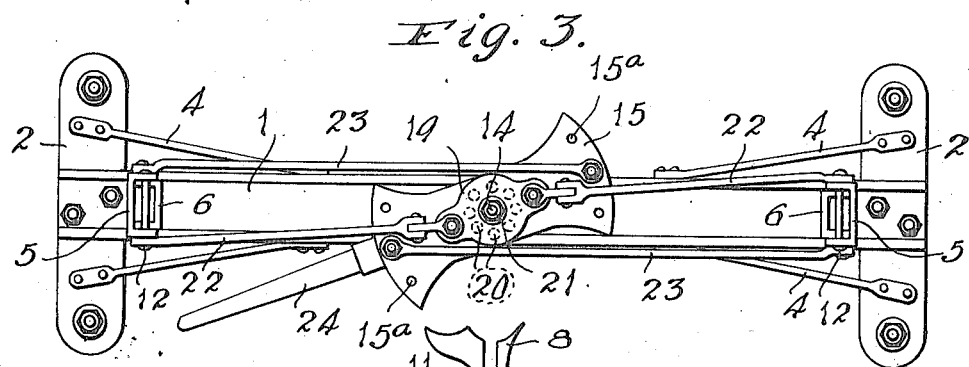
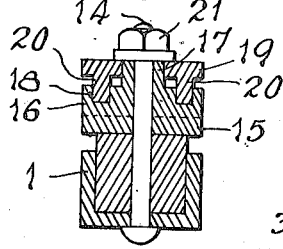
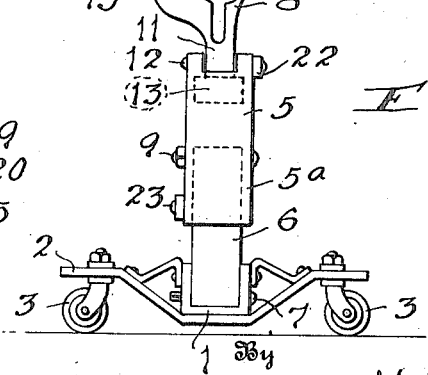
Inventor
J. J. OLSON
By
H. S. Hill
Attorney

UNITED STATES PATENT OFFICE.

JOHN J. OLSON, OF BELVIEW, MINNESOTA.

AUTOMOBILE-JACK.

1,254,527.   Specification of Letters Patent.   Patented Jan. 22, 1918.

Application filed April 21, 1917.   Serial No. 163,671.

*To all whom it may concern:*

Be it known that I, JOHN J. OLSON, a citizen of the United States, residing at Belview, in the county of Redwood, State of Minnesota, have invented a new and useful Automobile-Jack; and I do hereby declare the following to be a full, clear, and exact description of the invention, such as will enable others skilled in the art to which it appertains to make and use the same.

The present invention relates to a jack for use in connection with automobiles and like vehicles, and has for its object to provide a device of this character which can be readily moved from place to place and which will enable one entire end of a vehicle to be lifted above the ground without difficulty.

Further objects of the invention are to provide an automobile jack of this character which is comparatively simple and inexpensive in its construction, which can be easily manipulated, which can be adjusted to fit different makes and sizes of vehicles, and which enables both of the vehicle wheels to be removed and the vehicle itself to be moved with the jack still in operative position thereon.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a front elevation of the jack, showing the toggle levers at the ends thereof as swung into operative position.

Fig. 2 is a similar view, the toggle levers being shown as broken to lower the axle engaging seats preparatory to placing the jack in position under a vehicle or removing it therefrom.

Fig. 3 is a top plan view of the jack.

Fig. 4 is an end view thereof.

Fig. 5 is an enlarged sectional view through the pivotal mounting of the operating lever.

Corresponding and like parts are referred to in the following description and indicated in all the views of the drawings by the same reference characters.

The base of the jack includes a longitudinally extending channel shaped beam 1 which is rigidly connected at its ends to the cross bars 2, the extremities of the cross bars being deflected upwardly and provided with caster wheels 3 which support the base in an elevated position, but enable it to be moved without difficulty in any direction. Diagonal braces 4 are shown as extending between the cross bars 2 and the channel beam 1, thereby holding the said members rigidly in position.

A pair of toggle levers 5 and 6 is provided at each end of the beam 1, said toggle levers having a channel shaped formation and the lower toggle lever 6 of each pair being pivotally connected at 7 to the beam 1, while the upper toggle lever 5 of each pair is provided at its free end with an axle engaging seat 8. A pivot pin 9 connects each pair of toggle levers 5 and 6, and this pivot pin is adapted to be inserted through any selected one of a series of openings 10 in the upper toggle lever 5, thereby enabling the jack to be adjusted for operation in the most effective manner upon vehicles having high or low axles.

Each of the upper toggle levers 5 is provided at its pivot end with an extension 5ª which provides a means for bringing the toggle levers into alinement with each other, and also engages the lower lever 6 to limit the pivotal movement of the toggle levers when they have been brought into alinement with each other. The axle engaging seat 8 of each set of toggle levers is preferably carried by a stem 11 which is pivoted at 12 to the end of the upper toggle lever 5, and is provided with a pendant weight 13, said weight acting by gravity to hold the axle engaging seat 8 in an upright position at all times, so that no difficulty will be encountered in bringing it into proper engagement with the axle. It will be noted that the various pivotal connections are arranged in such a manner that when the toggle levers have been swung into an upright position and brought into alinement with each other, the pivot pin 9 will then move slightly beyond a dead center position so that the weight of the vehicle will tend to lock the jack in operative position.

A pivot stud 14 projects upwardly from the middle of the beam 1 and has a main operating lever 15 mounted thereon, said lever being arranged to swing in a horizontal plane, and being formed with a hub 16 and a threaded sleeve 17 projecting above the hub, the top of the hub having a series of openings 18 therein. A second lever 19 is mounted upon the sleeve 17 and provided with lugs 20 which are adapted to engage a selected set of the openings 18 to lock the second lever rigidly in a proper angular relation to the main lever 15. The two levers would normally be at substantially right angles to each other, although when adjusting the pivot pins 9 it would be necessary to make some slight corresponding adjustment of the lever 19. A nut 21 threaded upon the pivot bolt 14 serves to hold the upper lever 19 against the hub 16 so that it can not be accidentally moved out of position.

The extremities of the upper lever 19 are connected by links 22 to the upper ends of the upper toggle levers 5, while the ends of the lever 15 are similarly connected by links 23 to the extensions 5ª of the upper toggle levers 5. A handle 24 at one end of the main operating lever 15 enables the two levers 15 and 19 to be simultaneously moved, and as they are swung back and forth upon the pivot stud 14 as a center it will be obvious that the link members 22 and 23 will be alternately taken in and let out. When the main lever 15 is moved in one direction, the joints of the toggle levers will be broken and they will be swung downwardly into inoperative position, while when the main operating lever 15 is swung in the opposite direction the toggle levers will be brought into alinement with each other and the rear axle of a vehicle which may have been previously placed in engagement with the seats 8 forcibly lifted a sufficient amount to lift the wheels above the ground. The vehicle wheels can then be removed, and the vehicle itself can be moved with the jack still in operative position, since the base of the jack is supported by the caster wheels 3.

The pivot bolts 7 at the lower ends of the lower toggle levers 6 can be fitted in any selected ones of the openings 7ª, thereby enabling the jack to be readily adjusted for use upon both long and short axles. The main lever 15 is preferably in the form of a plate having flared ends which are each provided with a series of openings 15ª, thereby providing for an adjustable connection with the inner ends of the links 23.

Having thus described the invention, what I claim as new and desire to secure by Letters Patent, is:—

1. A jack including an elongated base, a pair of toggle levers at each end of the base, the lower toggle lever of each pair being pivotally connected to the base, while the upper toggle lever of each pair is provided at its free end with a seat and at its pivot end with an extension, a pair of levers mounted upon the base at an intermediate point in its length, said levers being rigid with each other and arranged at an angle, links connecting the toggle lever extensions to the extremities of one lever, and links connecting the free ends of the upper toggle levers to the other lever.

2. A jack including an elongated base, a pair of toggle levers at each end of the base, the lower toggle lever of each pair being pivotally connected to the base while the upper toggle lever of each pair is provided at its free end with a seat and at its pivot end with an extension, a pair of levers mounted upon the base at an intermediate point in its length, said levers being rigid with each other and arranged at an angle, means for adjusting the angular relation of the levers, links connecting the ends of one lever to the toggle lever extensions, and links connecting the other lever to the free ends of the upper toggle lever members.

3. A jack including an elongated base, a pair of toggle levers at each end of the base, the lower toggle lever of each pair being pivotally connected to the base, while the upper toggle lever of each pair is provided at its free end with a seat and at its pivot end with an extension, a lever pivotally mounted upon the base at an intermediate point in its length, said lever being formed with a hub, a second lever having an adjustable interlocking connection with the hub so as to be set at different angles thereto and held rigidly therewith, link connections between one of the levers and the toggle lever extensions, and link connections between the other lever and the free ends of the upper toggle levers.

4. A jack including an elongated base, a pair of toggle levers at each end of the base, the lower toggle lever of each pair being pivotally connected to the base while the upper toggle lever of each pair is provided at its free end with a seat and at its pivot end with an extension, a lever pivotally mounted upon the base at an intermediate point in its length and formed with a hub having a series of openings therein, a second lever provided with lugs adapted to enter selected openings of the hub to hold the second lever rigidly in an adjusted position with respect to the first lever, means for locking the second lever in an adjusted position, link connections between one of the levers and the toggle lever extensions, and link connections between the other lever and the free ends of the upper toggle levers.

5. A jack including an elongated base, a pair of toggle levers at each end of the base, the lower toggle lever of each pair being pivotally connected to the base, a seat pivotally connected to the free end of the upper toggle lever of each pair, a weight pendent from the pivoted stud and acting by gravity to hold the pivoted seat always in an upright position, and an operating lever mounted upon the base and operatively connected to the toggle levers for forcibly moving them into operative position.

In testimony whereof I have signed my name to this specification in the presence of two subscribing witnesses.

JOHN J. OLSON.

Witnesses:
   A. O. GIMMESTAD,
   C. C. ENESTVEDT.